(12) United States Patent
Clinchant et al.

(10) Patent No.: US 9,430,563 B2
(45) Date of Patent: Aug. 30, 2016

(54) DOCUMENT PROCESSING EMPLOYING PROBABILISTIC TOPIC MODELING OF DOCUMENTS REPRESENTED AS TEXT WORDS TRANSFORMED TO A CONTINUOUS SPACE

(75) Inventors: Stéphane Clinchant, Meylan (FR); Florent Perronnin, Domene (FR)

(73) Assignee: XEROX CORPORATION, Norwalk, CT (US)

( * ) Notice: Subject to any disclaimer, the term of this patent is extended or adjusted under 35 U.S.C. 154(b) by 895 days.

(21) Appl. No.: 13/364,535

(22) Filed: Feb. 2, 2012

(65) Prior Publication Data

US 2013/0204885 A1 Aug. 8, 2013

(51) Int. Cl.
*G06F 17/30* (2006.01)
*G06K 9/46* (2006.01)
*G06K 9/62* (2006.01)

(52) U.S. Cl.
CPC ......... *G06F 17/3071* (2013.01); *G06K 9/4676* (2013.01); *G06K 9/6232* (2013.01); *G06K 9/6277* (2013.01); *G06K 2209/01* (2013.01)

(58) Field of Classification Search
CPC ................ G06F 17/3071; G06F 17/30731; G06F 17/30634
USPC ............. 707/706, 728, 748, 750, 756, 760
See application file for complete search history.

(56) References Cited

U.S. PATENT DOCUMENTS

| | | | |
|---|---|---|---|
| 4,839,853 A | 6/1989 | Deerwester et al. | |
| 7,680,341 B2 | 3/2010 | Perronnin | |
| 7,756,341 B2 | 7/2010 | Perronnin | |
| 7,885,466 B2 | 2/2011 | Perronnin | |
| 7,885,794 B2 | 2/2011 | Liu et al. | |
| 8,229,729 B2 * | 7/2012 | Sarikaya et al. | 704/4 |
| 8,311,335 B2 * | 11/2012 | Rodriguez Serrano et al. | 382/186 |
| 2008/0126612 A1 | 5/2008 | Barrow et al. | |
| 2010/0098343 A1 | 4/2010 | Perronnin et al. | |
| 2010/0191532 A1 * | 7/2010 | Rodriguez Serrano et al. | 704/256.7 |

OTHER PUBLICATIONS

Qiao et al., "Two-way Gaussian Mixture Models for High Dimensional Classification", dated 2010, 18 pages.*
Asuncion, et al. "On smoothing and inference for topic models" Proc. of the 25th Conf. on Uncertainty in Artificial Intelligence, 2009, pp. 27-34.

(Continued)

*Primary Examiner* — Monica Pyo
(74) *Attorney, Agent, or Firm* — Fay Sharpe LLP (57) ABSTRACT

A set of word embedding transforms are applied to transform text words of a set of documents into K-dimensional word vectors in order to generate sets or sequences of word vectors representing the documents of the set of documents. A probabilistic topic model is learned using the sets or sequences of word vectors representing the documents of the set of documents. The set of word embedding transforms are applied to transform text words of an input document into K-dimensional word vectors in order to generate a set or sequence of word vectors representing the input document. The learned probabilistic topic model is applied to assign probabilities for topics of the probabilistic topic model to the set or sequence of word vectors representing the input document. A document processing operation such as annotation, classification, or similar document retrieval may be performed using the assigned topic probabilities.

24 Claims, 6 Drawing Sheets

(56) References Cited

OTHER PUBLICATIONS

Blei, et al. "Latent dirichlet allocation" Journal of Machine Learning Research, 2003, 3:993-1022.
Brants, T. "Topic-based document segmentation with probabilistic latent semantic analysis" Proc. of CIKM, 2002, pp. 211-218.
Buntine, et al. "Applying discrete pca in data analysis" AUAI'04: Proc. of the 20$^{th}$ Conf. on Uncertainty of artificial intelligence, 2004, pp. 59-66.
Chang, et al. "Reading tea leaves: how humans interpret topic models" NIPS, 2009, pp. 1-48.
Chappelier, et al. "Plsi: The True fisher kernel and beyond" Proc. of the European Conf. on Machine Learning and Knowledge Discovery in Databases: Part I, ECML PKDD'09, 2009, pp. 195-210.
Chattefield, et al. "The devil is in the details: an evaluation of recent feature encoding methods" BMVC, 2011, pp. 1-12.
Chemudugunta, et al. "Modeling general and specific aspects of documents with a probabilistic topic model" NIPS, 2006, pp. 241-248.
Church, et al. "Word association norms, mutual information, and lexiography" Comput. Linguist. Mar. 19990, 16:22-29.
Clinchant, et al. "Information-based models for ad hoc IR" Proc. of the 33$^{rd}$ Intl. ACM SIGIR Conf. on Research and development in information retrieval, SIGIR'10, 2010, pp. 234-241.
Clinchant, et al. "Lexical entailment for information retrieval" ECIR, 2006, pp. 217-228.
Csurka, et al. "XRCE's participation at medical image modality classification and ad-hoc retrieval tasks of imageclef 2011" Working notes of CLEF 2011, pp. 1-8.
Csurka, et al. "Visual categorization with bags of keypoints" Proc. of ECCV Workshop on Statistical Learning for Computer Vision, 2004, vol. 1, pp. 1-16.
Dhillon, I.S. "Co-clustering documents and words using bipartite spectral graph partitioning" KDD, 2001, pp. 269-274.
Hofmann, T. "Probabilistic latent semantic indexing" SIGIR, ACM 1999, pp. 50-57.
Jaakkola, et al. "Exploiting generative models in discriminative classifiers" Proc. of the 1998 Conf. on Advances in neural information processing systems II, NIPS 1999, pp. 487-493.
Jegou, et al. "Aggregating local descriptors into a compact image representation" CVPR 2010, pp. 3304-3311.
Naudts, J. "The q-exponential family in statistical physics" Journal of Physics: Conf. Series, 2010, 201(1):012003.
Perronnin, et al. "Adapted vocabularies for generic visual categorization" ECCV, 2006, pp. 464-475.
Perronnin, et al. "Fisher kernels on visual vocabularies for image categorization" CVPR, 2007, pp. 1-8.
Perronnin, et al. "Improving the Fisher kernel for large-scale image classification" ECCV, 2010, pp. 143-156.
Sahlgren, M. "An introduction to random indexing" Methods and Applications of Semantic Indexing Workshop at the 7$^{th}$ Intl. Conf. on Terminology and Knowledge Engineering, TKE 2005, vol. 5, pp. 1-9.
Dhillon, et al. "Multi-view learning of word embeddings via CCA" Advances in Neural Information Processing Systems 24, 2011, pp. 199-207.
Blei, et al. "Supervised topic models" Advances in Neural Information Processing Systems 20, Jan. 1, 2008, pp. 121-128.
Blei, et al. "Probabilistic Topic Models" IEEE Signal Processing Magazine, vol. 27, No. 6, Nov. 1, 2010, pp. 55-65.
Deerwester, et al. "Indexing by Latent Semantic Analysis" Journal of the American Society for Information Science, vol. 41, No. 6, Sep. 1, 1990, pp. 391-407.
Goodman, et al. "A Gaussian Mixture Model Classifier Using supervised and unsupervised learning" Annals IEEE International Symposium on Signal Processing and its applications vol. 2, Aug. 25, 1996, pp. 565-566.
"Singular Value Decomposition", Wikipedia, Retrieved from http://en.wikipedia.org/wiki/Singular_value_decomposition on Oct. 25, 20111, pp. 1-21.

* cited by examiner

DOCUMENT PROCESSING EMPLOYING PROBABILISTIC TOPIC MODELING OF DOCUMENTS REPRESENTED AS TEXT WORDS TRANSFORMED TO A CONTINUOUS SPACE

BACKGROUND

The following relates to the automated information management arts, automated document retrieval arts, automated document annotation or labeling arts, and related arts.

Document processing operations such as automated classification or topic labeling, document retrieval based on a query or representative document, or so forth, typically employ a so-called "bag of words" or BOW representation. The BOW representation is typically computed for documents of a set of documents, and is a vector in which each dimension corresponds to a particular term (i.e., word) occurring in the set of documents, and the value stored for each dimension corresponds to the frequency of occurrence of that word in the document. In some cases the frequency is normalized by the total number of words in the document (to reduce the effect of document length) and/or is scaled by a metric indicative of the frequency of occurrence of the word in the set of documents. An example of the latter is the TF-IDF representation, where IDF stands for "inverse document frequency" and is computed by a formula such as $|D|/(N_w+1)$ where $|D|$ is the number of documents in the set of documents, $N_d$ is the number of those documents containing the word w, and the "+1" avoids division by zero in the case of a word occurring in none of the documents (optionally omitted if the BOW vector elements are limited to words that occur in at least one document).

To translate the BOW representations into topical information, the BOW representations of the set of documents are typically modeled by a topical model. Two commonly used probabilistic topical models are: probabilistic latent semantic analysis (PLSA) and Latent Dirichlet Analysis (LDA). In effect, these techniques define topics (sometimes called categories or classes) in which each topic is defined by a representative BOW vector. An input (e.g., query) document is then assigned in a probabilistic sense to various categories based on how closely the BOW vector of the input document matches the representative BOW vectors of the various topics.

BOW representations modeled by a probabilistic topic model such as PLSA or LDA are widely employed in applications such as document annotation/archiving and document retrieval. For annotation purposes, an input document can be labeled with the topic or topics that most closely match the BOW vector of the input document. Document retrieval entails retrieving documents having the same or similar topic labels, or alternatively can operate directly on the BOW vectors (i.e., by retrieving documents whose BOW vectors are most similar to the BOW vector of the input document).

BRIEF DESCRIPTION

In some illustrative embodiments disclosed as illustrative examples herein, an apparatus comprises an electronic data processing device configured to perform a modeling method including: applying a set of word embedding transforms to transform text words of a set of documents into K-dimensional word vectors in order to generate sets or sequences of word vectors representing the documents of the set of documents where K is an integer greater than or equal to two (and more preferably greater than or equal to five, and still more preferably greater than or equal to ten); and learning a probabilistic topic model using the sets or sequences of word vectors representing the documents of the set of documents wherein the learned probabilistic topic model operates to assign probabilities for topics of the probabilistic topic model to an input set or sequence of K-dimensional embedded word vectors.

In some illustrative embodiments disclosed as illustrative examples herein, in a non-transitory storage medium storing instructions executable by an electronic data processing device to perform operations including (i) applying a set of word embedding transforms to transform text words of a document into corresponding K-dimensional word vectors in order to generate a set or sequence of word vectors representing the document where K is an integer greater than or equal to two (and more preferably greater than or equal to five, and still more preferably greater than or equal to ten) and (ii) performing a document processing operation using the set or sequence of word vectors representing the document.

In some illustrative embodiments disclosed as illustrative examples herein, a method comprises: embedding text words of a document into a K-dimensional space where K is an integer greater than or equal to two (and more preferably greater than or equal to five, and still more preferably greater than or equal to ten); and applying a probabilistic topic model to the embedded text words to assign probabilities for topics of the topic model to the document. The embedding and the applying are suitably performed by an electronic data processing device.

DETAILED DESCRIPTION

BOW representations modeled by a probabilistic topic model such as PLSA or LDA are widely employed in applications such as document annotation/archiving and document retrieval. However, it is recognized herein that these approaches have some disadvantages. The BOW representation of a document can be of high dimensionality, since the BOW vector has dimensionality equal to the vocabulary used in the document modeling. This problem can be partially addressed by omitting frequent and uninformative "stop" words from the vocabulary (e.g., words like "the" which occur ubiquitously and carry little informational content), but this still leaves a large vocabulary, e.g. of order 10,000-100,000 words in some practical applications.

A further disadvantage is that the BOW representation treats each word as a discrete element that is unrelated to any other words of the vocabulary. The probabilistic topic model is typically relied upon to capture word-word correlations as part of the topic modeling, for example by capturing co-occurrences of words in the same document or in a set of documents ultimately assigned to the same topic. However, capturing such correlations at the probabilistic topic model stage obscures the nature of the various word correlations, and it is difficult for even a skilled artisan to comprehend the various correlations between words embodied by the final probabilistic topic model. This, in turn, makes it difficult or impossible to adjust the model to account for possible semantic changes in the meaning of words over time. For a different reason, the vocabulary of the BOW representation is also difficult or impossible to expand. This is because the addition of a new word fundamentally alters the BOW vector by adding a new dimension.

Figure 1:
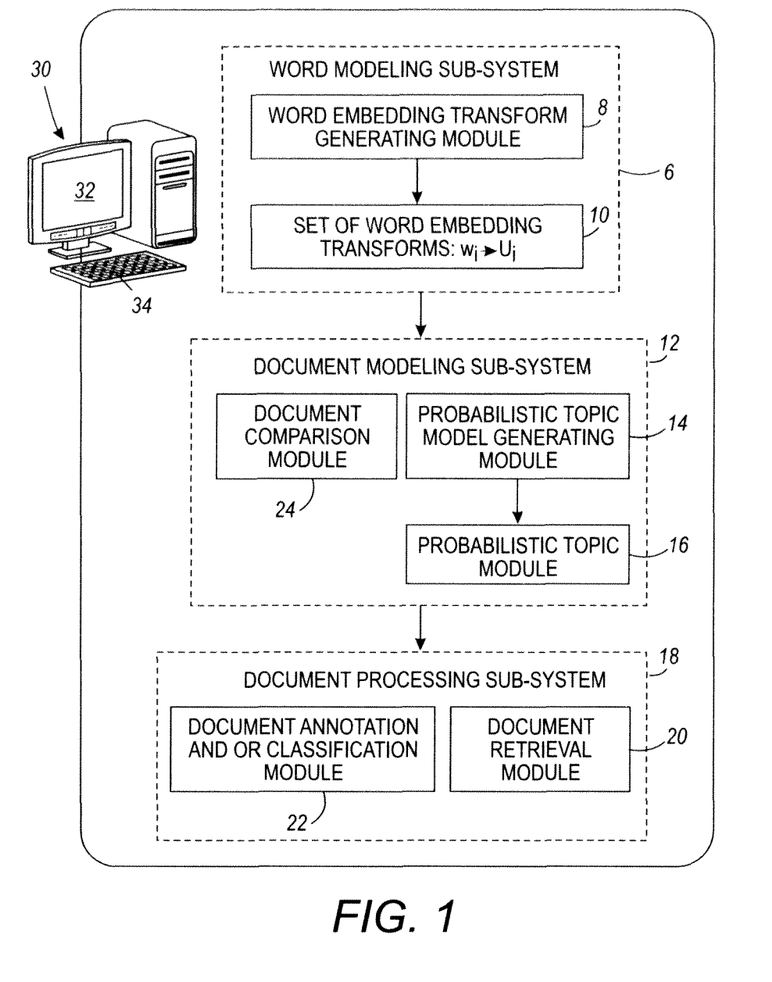
FIG. 1 diagrammatically shows an illustrative document processing system.

With reference to FIG. 1, an improved system for performing automated information management, automated document retrieval, automated document annotation or labeling, and other document processing operations is based on early modeling of individual text words. In the illustrative approach, a word modeling sub-system 6 includes a word embedding transform generating module 8 that generates a set of word embedding transforms 10 of the form $w_i \rightarrow U_i$ where $w_i$ is a text word used in the document processing and $U_i$ is a vector (i.e., "word vector") that maps or embeds the text word $w_i$ in a K-dimensional space as a K-dimensional vector $U_i$. The set of text words $w_i$ for which transforms are generated include all words used in the document processing. This set of text words is also referred to herein as the set of vocabulary words. In some embodiments the set of vocabulary words includes all text words in a set of training documents except selected "stop" words such as "a", "an", "the", "and", or so forth that occur frequently and have limited informational content. The set of vocabulary words optionally also excludes text words that occur too infrequently (e.g., only one time in the entire set of documents, or that occur in only a single document of the set of documents). Still further, in some embodiments certain vocabulary words may actually be phrases, e.g. "pump motor" might be treated as a single vocabulary word in some embodiments. As another contemplated variation, in a language such as Chinese a text word is typically represented in a document as a unique character or character combination, rather than as an ordered sequence of alphabetic characters. This does not impact the BOW representation or the transform $w_i \rightarrow U_i$.

The use of the word modeling sub-system 6 overcomes many of the disadvantages of the BOW approach. The high dimensionality issue is overcome by setting the dimensionality K of the embedding space to be substantially smaller than the dimensionality of a corresponding bag-of-words (BOW) vector. For example, if the vocabulary consists of 50,000 words then the BOW vector has 50,000 dimensions; in such a case, K may be of order a few dozen to a few hundred dimensions. Additionally, if the embedding transforms 10, i.e. the transforms $w_i \rightarrow U_i$, are computed based on some information semantically relating the vocabulary words, then the embedded word vectors $U_i$ can have geometrical relationships modeling semantic relationships of the corresponding words $w_i$. For example, for a suitable set of transforms, a set of words which are synonyms of one another can be transformed into vectors (i.e. points in the K-dimensional space) that are localized in a common region of the K-dimensional space. In such a case, the correlation (if any) between words $w_i$ and $w_j$ is readily assessed by computing the distance between the corresponding embedded vectors $U_i$ and $U_j$. Still further, the word modeling sub-system 6 readily accommodates adding new words by adding new corresponding embedding transforms, without changing the dimensionality of the K-dimensional embedding space. Similarly, a change over time in the semantic meaning of an existing vocabulary word can be accommodated by adjusting its embedding transform.

With continuing reference to FIG. 1, these advantages can be achieved without substantively modifying the existing document modeling paradigm. For example, an illustrative document modeling sub-system 12 suitably includes a probabilistic topic model generating module 14 that generates a probabilistic topic model 16 that models documents represented by bags (or optionally sequences) of embedded word vectors $U_i$ generated by applying the embedding transforms 10 to the words of the document. In illustrative embodiments set forth herein, the probabilistic topic model 16 is a Gaussian mixture model (GMM) in which each constituent Gaussian component lies in the K-dimensional embedding space and represents a particular semantic topic. Without loss of generality, if there are M Gaussian components in the GMM then the model represents M topics. If the documents are represented by sequences of embedded word vectors, then a suitable probabilistic model is a hidden Markov model (HMM). The probabilistic topic model 16 provides similar functionality to that provided by existing PLSA or LDA models of BOW document representations. Thus, the probabilistic topic model 16 can be used by a document processing sub-system 18, for example including a document retrieval module 20 that retrieves documents similar to a query document (which may be a textual query) as indicated by the probabilistic topic model 16 and/or a document annotation and/or classification module 22 that annotates an input document with the topic or set of topics of the probabilistic topic model 16 that most closely match the input document.

Additionally or alternatively, some document processing can be performed by directly using the bag or sequence of embedded word vectors $U_i$, without recourse to the illustrative probabilistic topic model 16. For example, the document retrieval module 20 can operate based on direct comparison of the bags or sequences of embedded words representing the input document and documents that are candidates for retrieval. As another example, an illustrative documents comparison module 24 can generate a comparison metric (e.g., similarity measure) comparing two documents by direct comparison of their bags or sequences of embedded words, again without recourse to the probabilistic topic model 16.

The disclosed document processing system including the various sub-systems 6, 12, 18 and constituent modules 8, 14, 20, 22, 24 is suitably embodied by an electronic data processing device such as an illustrative computer 30. More generally, the electronic data processing device may be a computer (e.g., notebook computer, desktop computer, tablet computer, network server computer, or so forth), personal data assistant (PDA), smartphone, or so forth. The computer 30 or other electronic data processing device optionally includes a display device 32 (e.g., an flat-screen display of a notebook or desktop computer) for displaying results such as retrieved documents, automatically proposed document annotations (in embodiments where such annotations are to be reviewed by a human reviewer before labeling the document with the annotations), or so forth. The computer 30 or other electronic data processing device optionally also includes one or more user input devices such as an illustrative keyboard 34, and/or a mouse, trackball, trackpad or other pointing device, or so forth, via which a user may input or identify a query document for initiating a document retrieval or annotation operation.

Moreover, the disclosed document processing techniques may be embodied as a non-transitory storage medium storing instructions that are readable by and executable by the illustrative computer 30 or other electronic data processing device to perform the disclosed document processing techniques. The non-transitory storage medium may, for example, include a hard disk drive or other magnetic storage medium, a flash memory, random access memory (RAM), read-only memory (ROM), or other electronic memory medium, or an optical disk or other optical storage medium, or so forth, or various combinations thereof.

Figure 2:
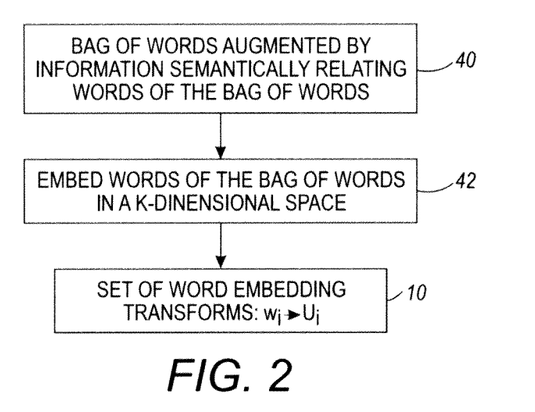
FIG. 2-4 illustrate processing suitably performed by the word embedding transform generating module of the system of FIG. 1.

With reference to FIG. 2, operation of the word embedding transform generating module 8 is described. The module receives as input a set (e.g., bag) of words 40 to be embedded in the K-dimensional space. The bag of words 40 is augmented by information semantically relating words of the bag of words. In some embodiments the bag of words 40 is represented as a set of text-based documents that utilize the text words to be embedded in natural language sentences, and this natural language context provides the information semantically relating the words. Additionally or alternatively, other types of semantic information may be provided, such as identification of certain words as being synonyms or antonyms. The word embedding transform generating module 8 embeds the words in the K-dimensional space in an operation 42 to generate the set of word embedding transforms 10. In a suitable approach, the operation 42 constructs the set of word embedding transforms 10 as a data structure associating text words with corresponding K-dimensional word vectors such that correlations between text words in the set of training documents (or correlations indicated by other auxiliary semantic information) maps to separation between the corresponding associated K-dimensional word vectors. Thus, the word vectors for two synonyms that are used substantially interchangeably should be close to one another in the K-dimensional space; whereas, the word vectors for two words that are anti-correlated or wholly independent should be far apart in the K-dimensional space.

Figure 3:
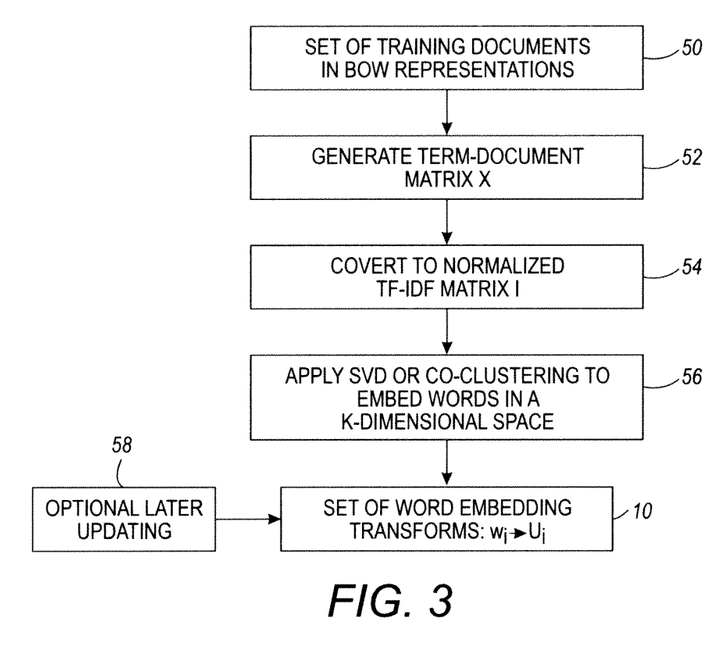

With reference to FIG. 3, a more detailed illustrative example of operation of the word embedding transform generating module 8 is described. In this example the word embedding transform generating module 8 operates on a set of training documents 50 represented as bags of words (BOW). In an operation 52, the BOW representations are configured as a term-document matrix X. In an operation 52, the corpus of documents 50 is represented as a term-document matrix $X=(x_{w,d})$ where rows correspond to words and columns to documents. Put another way, each column of the term-document matrix X is the BOW representation of one document. The term document matrix X has size t×n where t is the number of indexing terms (i.e., text words of the vocabulary) and n the number of documents in the collection 50. In an operation 54, the term-document matrix X is converted to a term frequency-inverse document frequency (TF-IDF) matrix I. The TF-IDF matrix I can be thought of as a normalized version of the term-document matrix X. In an operation 56, a dimensionality reduction algorithm is applied to generate K-dimensional word vectors corresponding to the text words of the term-document matrix. Let us denote by $W=\{w_i, i=1 \ldots N\}$ the vocabulary of words used in the model generation. (As discussed elsewhere herein, although a fixed set of vocabulary words is used in the initial model training, an advantage of the disclosed approaches is that the set of vocabulary words can be readily expanded after generation of the model to include words that were unseen during the training by embedding new words in the K-dimensional space). The set of word embedding transforms 10 can be represented as a data structure associating text words with corresponding K-dimensional word vectors, such as a two-column table or look-up table with the words $w_i$ in the first column and the corresponding K-dimensional word vectors $U_i$ in the second column. In a suitable approach, a rank-K approximation of the matrix I is used to embed words. Some suitable dimensionality reduction algorithms include: Singular Value Decomposition (SVD), Random Indexing, Co-Clustering, or so forth. In an illustrative example, SVD is applied to the TF-IDF matrix I according to the conventional SVD approximation $I \approx U \Sigma V$ where I has dimensions t×n, U has dimensions t×K, $\Sigma$ has dimensions K×K, V has dimensions K×n and K<n (typically we have K<<n). The embedding of word $w_i$ is given by the i-th column of U, that is, the K-dimensional word vector for word $w_i$ is $U_i=[U_{i,1} \ldots U_{i,K}]$. A document d which is of length (in words) $l_d$ and which can be represented by a bag of words $\{w_{d(i)}, i=1 \ldots l_d\}$ can then be represented as a bag of "continuos words", i.e. by a bag of word vectors, given by $\{U_{w_{d(i)}}, i=1 \ldots l_d\}$.

As an example, consider the three-word (French language) document: 'Corbeau fromage Corbeau' (this example was inspired by the French poet La Fontaine). Further suppose that the constituent text words are represented in a vectorial space with K=5 dimensions as: Corbeau=[0.1–2.5 7.8 0.001–4] and fromage=[12.3 45.1–0.01–1–7.2]. Then document 'Corbeau fromage Corbeau' would be represented as follows:

$$d=\{[0.1-2.5\ 7.8\ 0.001-4],[12.3\ 45.1-0.01-1-7.2], [0.1-2.5\ 7.8\ 0.001-4]\}$$

Here a bag-of-embedded words (BOEW) representation is used in which the order of the word vectors is not maintained. Alternatively, if the order of words in the document is important, the document can be represented by the ordered sequence:

$$d=[[0.1-2.5\ 7.8\ 0.001-4],[12.3\ 45.1-0.01-1-7.2], [0.1-2.5\ 7.8\ 0.001-4]]$$

which can also be thought of as a vector of word vectors. Note, however, that even in the unordered BOEW representation, information on the number of occurrences of a given word in the document is retained. In the above example, there are two "copies" of the vector [0.1–2.5 7.8 0.001–4] corresponding to the word Corbeau, because the word Corbeau occurs twice in the document. (In a conventional bag of words representation, the BOW vector would have one dimension for the word Corbeau having a value of two so as to indicate the two occurrences of the word Corbeau.)

With continuing reference to FIG. 3, the SVD algorithm applied to the TF-IDF matrix I yields the set of word embedding transforms $w_i \rightarrow U_i$ 10. The relationship between semantically similar words is readily apprehended in the embedded space by the closeness of the corresponding word vectors in the K-dimensional space. In view of this, it is contemplated to provide optional later updating 58 of one or more of the word embedding transforms $w_i \rightarrow U_i$ to reflect changes in the meaning of words over time. For example, the word "bad" is generally considered to be an antonym of "good", and so one might expect the word vector for "bad" to be far away from the word vector for "good" in the K-dimensional space. However, in American slang the word "bad" is sometimes used to indicate approval, i.e. as a synonym for "good". If such slang usage becomes more prevalent over time in documents under analysis, this can be accommodated in operation 58 by adjusting the word vector for "bad" to be closer to the word vector for "good".

Figure 4:
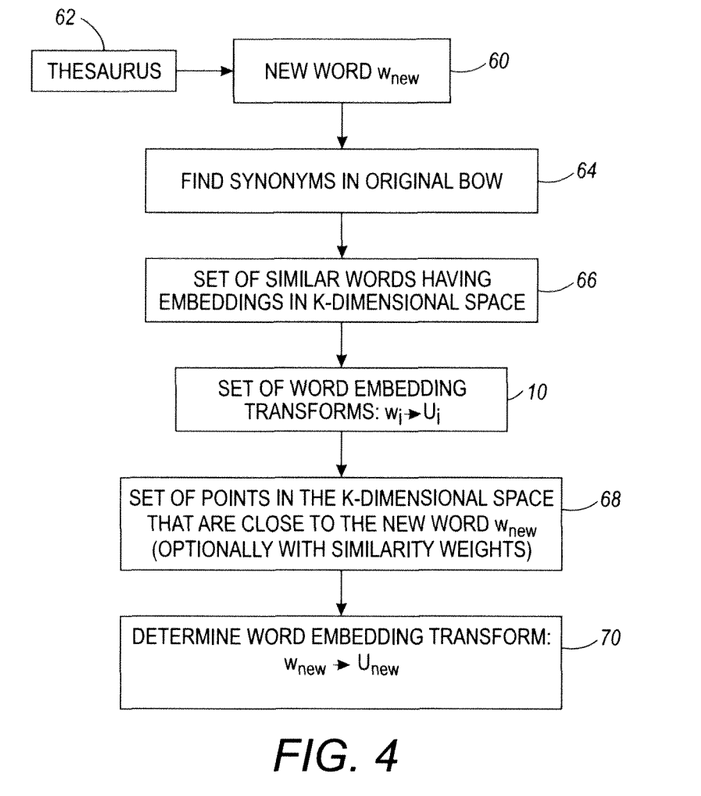

With reference to FIG. 4, it is also possible to add new words to the vocabulary after the initial generation of the word embedding transforms $w_i \rightarrow U_i$ 10 (for example, as per the process of FIG. 3). FIG. 4 shows an approach for adding a new word $w_{new}$ 60. A thesaurus 62 is consulted in an operation 64 to identify a set of words 66 that are related to the new word $w_{new}$ (e.g., synonyms) and that are embedded in the K-dimensional space. Accordingly, the set of word embedding transforms $w_i \rightarrow U_i$ 10 can be applied to the (already embedded) similar words 66 to generate a set of points (i.e., word vectors) 68 in the K-dimensional space that are expected to be close to the "correct" word vector for the new word $w_{new}$. Optionally, the points (i.e., word vectors) 68 can be weighted based on the closeness of the words to the new word $w_{new}$, so that words that are expected to be very closely related to $w_{new}$ are weighted higher than words that are expected to be less closely related to $w_{new}$. This is the case when using for instance the Nyström approximation. In an operation 70, the set of points (i.e., word vectors) 68 are aggregated (e.g., using averaging or a weighted average) to generate a word embedding transform $w_{new} \rightarrow U_{new}$ for the new word $w_{new}$ 60. This straightforward approach for adding the new word $w_{new}$ 60 to the vocabulary is to be compared with the case for a BOW representation, where the new word $w_{new}$ would change the dimensionality of the BOW vector thus fundamentally changing the BOW model.

As already mentioned, the set of word embedding transforms 10 can be represented as a data structure such as a look-up table associating vocabulary words $w_i$ with corresponding K-dimensional word vectors. As a consequence, applying the word embedding transforms 10 to the words of a particular document is a fast operation—the word vector corresponding to each word of the document is merely looked up in the look-up table and the document is represented by the resulting bag or set of word vectors (or alternatively, as the resulting sequence of word vectors if word order is maintained). No computation is involved in applying the word embedding transforms 10 (except for new unseen words, which when first encountered as suitably processed as per FIG. 4 to generate the new embedding transform $w_{new} \rightarrow U_{new}$; thereafter, the new embedding transform $w_{new} \rightarrow U_{new}$ is stored in the look-up table and hence is available for future use).

The word embedding transforms $w_i \rightarrow U_i$ 10 transform discrete quantities, i.e. vocabulary words $w_i$, into continuous quantities, i.e. K-dimensional word vectors $U_i$ with continuous real-valued elements. The resulting BOEW representation is a bag of embedded continuous words, which provides flexibility in representing fine differences in semantic meaning.

Figure 5:
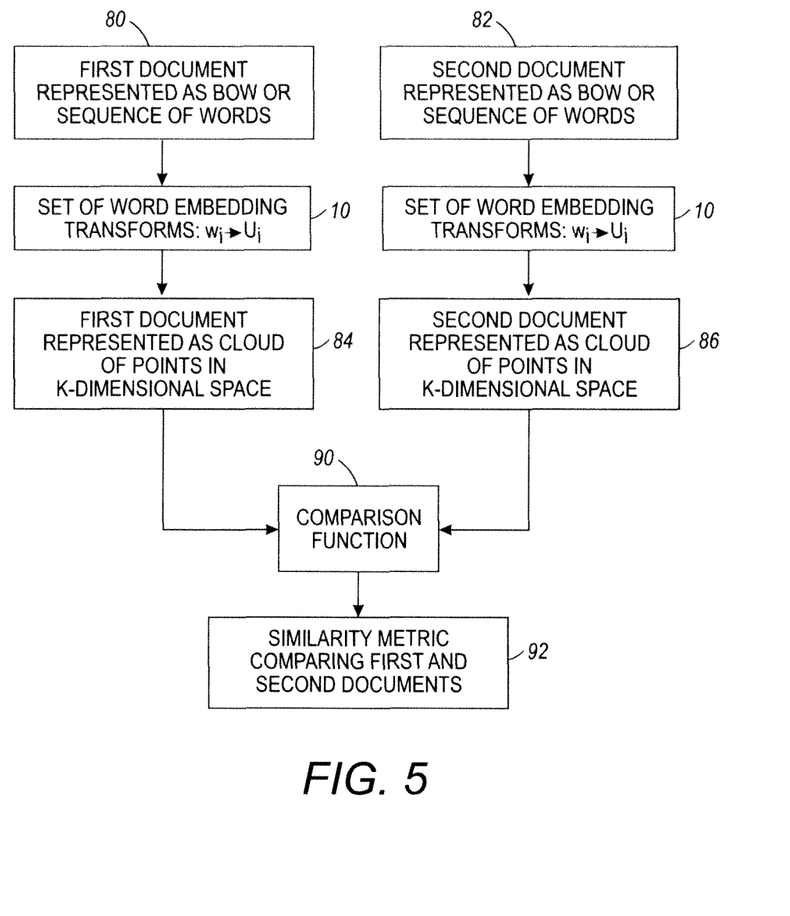
FIG. 5 illustrates processing suitably performed by the documents comparison module of the system of FIG. 1.

With reference to FIG. 5, a suitable operation of the documents comparison module 24 of FIG. 1 is described. Two documents 80, 82 are to be compared. The set of word embedding transforms 10 are applied to the words of the first document 80 to generate a corresponding first document representation 84 as a cloud of points in the K-dimensional space (or, alternatively visualized, a set of K-dimensional word vectors). The set of word embedding transforms 10 are applied to the words of the second document 82 to generate a corresponding second document representation 86 as a cloud of points in the K-dimensional space (or, alternatively visualized, a set of K-dimensional word vectors). A comparison function 90 then compares the two clouds of points to generate a similarity metric 92. One suitable comparison metric may, for example, be the difference between the centroids of the two clouds of points. Optionally, the comparison function 90 can be more complex and may yield the similarity metric 92 as a set of values, e.g. a difference in centroids and a difference in some spread function characterizing the two clouds of points.

The comparison operation of FIG. 5 is similar to comparing to BOW document representations by comparing the two BOW vectors. However, in the BOW document processing paradigm the two vectors being compared are likely to be of large dimensionality (e.g., 10,000-100,000 elements). This makes the comparison difficult. In the BOW document processing paradigm, it is conventional to learn a topic model which has the effect of reducing this dimensionality. Additionally, a topic model having semantically meaningful topics enables or facilitates various document processing operations such as annotating documents (topics of the topic model can be used to define annotation labels) and document retrieval (documents assigned to the same topics by the topic model are likely to be similar and suitable for retrieval). Advantageously, the bag (or sequence) of embedded words (BOEW or SOEW) document processing paradigm disclosed herein is readily amenable to incorporating topic modeling. Indeed, such modeling applied to the low-dimensional word vectors is generally computationally easier than the equivalent modeling of much higher dimensionality BOW representations.

The probabilistic topic model generating module 14 of FIG. 1 operates to generate the probabilistic topic model 16 by learning probabilistic topic model parameters $\Phi$ for the relation $D:P(D=d|\Phi)$ where P is a probability density function (e.g., a Gaussian mixture model, i.e. GMM, in the illustrative examples) and $\Phi$ denotes its parameters. The parameters $\Phi$ for the GMM distribution can be written as $\Phi = \{b_m, \mu_m, \sigma_m, \forall m \in [1 \ldots M]\}$ where $b_m$ is the probability to choose the Gaussian m, $\mu_m$ the mean of Gaussian m, and $\sigma_m$ the variance of Gaussian m (assuming diagonal covariance matrices). Without loss of generality, it is assumed herein that the model includes M Gaussian components. The probabilistic topic model is a generative model in which each text word is generated by a mixture of Gaussian distributions, that is:

$$P(w|\Phi) = \sum_{m=1}^{M} b_m P_m(U_m|\Phi)$$

This corresponds to the polythematiciy assumption of PLSA/LDA, namely the fact that different parts of a document can be generated by a different topic. Each Gaussian component $N(\mu_m, \sigma_m)$ has dimensionality K and lies in the K-dimensional space in which the words are embedded. Accordingly, each Gaussian component $N(\mu_m, \sigma_m)$ can be viewed as representing a textual topic. Assuming that words are generated independently from each other (as in PLSA/LDA) the log-likelihood of a document is suitably given by:

$$\log P(d|\Phi) = \sum_{i=1}^{l_d} \log P(w_i|\Phi)$$

Figure 6:
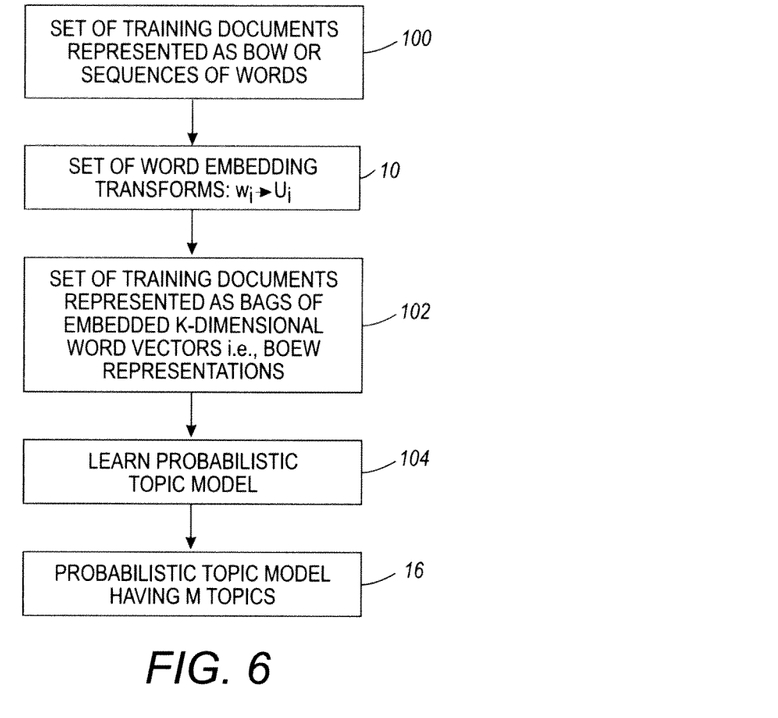
FIG. 6 illustrates processing suitably performed by the probabilistic topic model generating module of the system of FIG. 1.

With reference to FIG. 6, the model parameters $\Phi = \{b_m, \mu_m, \sigma_m, \forall m \in [1 \ldots M]\}$ are learned using a set of training documents 100 suitably represented as BOW representations or as a sequence of words. In the latter case, any stop words (e.g., frequent and uninformative words and/or very infrequent words) are filtered out before commencing the learning, so that the learning operates only on the vocabulary words. The set of training documents 100 may be the same as the set of training documents 50 used in generating the word embedding transforms (see FIG. 3), or may be completely different, or the sets of training documents 50, 100 may have a partial overlap or one may be a subset of the other. The word embedding transforms $w_i \rightarrow U_i$ 10 are applied to the text words of the training documents 100 to generate a set of training documents 102 represented as bags of K-dimensional word vectors (also referred to herein as a bag-of-embedded-words or BOEW). In the BOEW document representation the order of the words is not maintained, that is, the ordering of the word vectors in each bag (or set) of word vectors has no particular significance. (Alternatively, word order may be maintained, in which case a sequence of embedded words, SOEW, representation would be generated. The SOEW representation cannot be generated directly from a BOW representation since the BOW vector has already lost the word sequence information). In the BOEW representation, word duplication within a document is still maintained, that is, if a given word $w_i$ occurs n>1 times in a single document then the BOEW representation will include n copies of the corresponding word vector $U_i$ (or, alternatively, the BOEW representation can employ a data structure that includes a field for storing a count of occurrences for multiply occurring words). If the training documents 100 are represented as sequences of words then this duplication occurs naturally since the word sequence representing the document will include n duplicates of word $w_i$, each of which is transformed to $U_i$. On the other hand, if a BOW representation is used for the training documents 100, then each word is transformed to its corresponding word vector and then n copies of the word vector are added to the BOEW representation. The value n in this case is obtained from the value of the BOW vector dimension representing the word $w_i$, which stores the count n of occurrences of the word $w_i$ in the document (possibly scaled by the total number of words in the document, i.e. $l_d$). After the word embedding operation 102, the probabilistic topic model (e.g., GMM in the illustrative case) is learned on the set of training documents 102 represented as BOEW representations. A suitable learning approach for the GMM probabilistic topic model is to maximize the document log-likelihood:

$$\log P(d | \Phi) = \sum_{i=1}^{l_d} \log P(w_i | \Phi)$$

summed over all the documents (or a suitable subset) of the set of (BOEW) training documents 102 respective to the set of GMM parameters $\Phi$ using an expectation-maximization (EM) technique or another suitable technique for maximizing the log-likelihood objective function. The resulting learned topic model 16 is, in this illustrative embodiment, a GMM having (again, without loss of generality) M Gaussian components delineating M topics. Intuitively, the location of the mean $\mu_m$ of Gaussian m in the K-dimensional space denotes the semantic "meaning" or "significance" of the topic m, and one way to represent this semantic meaning or significance is to represent the topic m as the set of vocabulary words whose word vectors lie within, e.g. one variance $\sigma_m$, of the mean $\mu_m$. This can be done entirely automatically, or alternatively the representative text words can be presented to a user via the display device 32 (see FIG. 1) for review and optional editing by the user via the keyboard 34 or other user input device. The representative word or words (e.g., automatically selected as the one, or few, vocabulary words whose embedded word vectors lie closest to the mean $\mu_m$, or semi-automatically selected by presenting the words to the user as proposed labels and allowing the user to select or edit the topic label) are suitably used as a textual topic label for use in document annotation.

Figure 7:
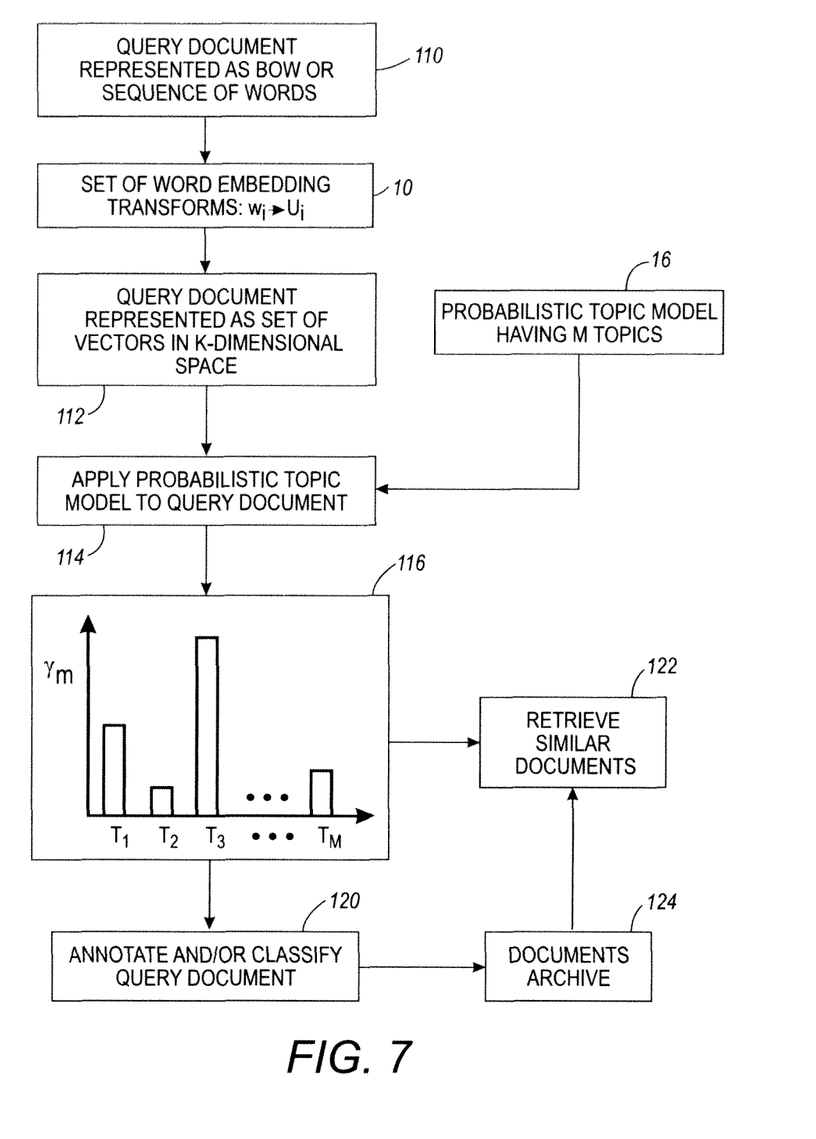
FIG. 7 illustrates processing suitably performed by the document processing sub-system of the system of FIG. 1.

With reference to FIG. 7, the learned probabilistic topic model 16 can be applied to assign probabilities (not necessarily normalized) for topics of the probabilistic topic model 16 to the set (or sequence) of word vectors representing the input document. The document processing sub-system 18 (see FIG. 1) can then perform one or more document processing operations on the document represented by the assigned topic probabilities. In the example of FIG. 7, a query document (i.e., input document) 110 is received, again represented as a BOW vector or as a sequence of words (suitably filtered to remove any stop words). The word embedding transforms $w_i \rightarrow U_i$ 10 are applied to the text words of the query document 110 to generate the query document 112 in a bag of embedded words (BOEW) representation. In an operation 114 performed by the probabilistic topic model generating module 14 (see FIG. 1), the learned probabilistic topic model 16 is applied to assign probabilities for topics of the probabilistic topic model to the input document in the BOEW representation 112. Various approaches can be used. In one approach, a histogram 116 of topic probabilities (also called "occupancy probabilities" herein) for the M topics is generated as follows. The word-level occupancy probability $\gamma_m(w_i)$ for Gaussian component m and text word $w_i$ is computed as:

$$\gamma_m(w_i) = \frac{b_m P_m(w_i | \Phi)}{\sum_{m=1}^{M} b_m P_m(w_i | \Phi)}$$

The document-level occupancy probability for Gaussian component m and the document d is then given by $$\gamma_m(d) = \frac{1}{l_d} \sum_{i=1}^{l_d} \gamma_m(w_{d(i)})$$

and the set of occupancy probabilities for the M topics (i.e., the histogram 116) is suitably represented as a M-dimensional vector:

$$\gamma(d) = \left[ \frac{1}{l_d} \sum_i \gamma_1(w_{d(i)}), \ldots , \frac{1}{l_d} \sum_i \gamma_M(w_{d(i)}) \right]$$

or as the square-root of this vector (so that the dot-product between two vectors is equivalent to the Bharttacharyya similarity).

With continuing reference to FIG. 7, the resulting histogram 116 can be used by the document annotation and/or classification module 22 (see FIG. 1) to perform an annotation operation 120. For example, the document d may be classified as belonging to any topic m for which the occupancy probability $\gamma_m(d)$ exceeds a threshold value. In an alternative approach for operation 120, the document d may be classified as belonging to the "top N" topics having the highest occupancy probabilities (where N is some selected integer, e.g. N=1 to assign the document to a single most relevant topic, or N=3 to assign the document to the three most relevant topics). If it is desired to annotate the document, textual topic labels for these topics can be used as textual document annotations.

Additionally or alternatively, the histogram 116 can be used by the document retrieval module 20 (see FIG. 1) to perform a document retrieval operation 122 in which one or more documents stored in a documents archive 124 are identified as being similar to the input document 110. The similarity with the input document 110 can be quantified based on the probabilities for the topics of the probabilistic topic model 16 as represented by the histogram 116. In this document processing operation, it is assumed that the documents of the archive 124 have already undergone the modeling (i.e. operations 110, 114 have been applied to each archive document) and each archive document is represented as a histogram (e.g., vector) of occupancy probabilities for the M topics. The similarity can be computed as a Bharttacharyya similarity or other vector comparison metric. It is also noted that the query document 110 along with metadata including the modeling result 116 and optional annotations is in suitable form for being added to the document archive 124 for later retrieval.

With continuing reference to FIG. 7, the document modeling operation 114 performed by the probabilistic topic model generating module 14 (see FIG. 1) can use other modeling approaches. In another illustrative modeling approach, a Fisher Vector (FV) representation employs the Fisher kernel framework (see Jaakkola et al., "Exploiting generative models in discriminative classifiers", in Proceedings of the 1998 conference on Advances in neural information processing systems II, pages 487-493, Cambridge, Mass., USA, 1999, MIT Press) to model the document d (represented as a BOEW) by considering the gradient vector of the log-likelihood according to the parameters of Φ. In this example, gradients of $\log p(x_i|\Phi)$) with respect to the mean and standard deviation parameters are employed. If the feature space has dimensionality K and the topic model is a GMM with M Gaussian components, then the Fisher vector has 2×K×M dimensions. Within this framework the following closed form formulas can be generated (see Perronnin et al., "Fisher kernels on visual vocabularies for image characterization", in CVPR 2007):

$$FV_\mu(d; m, k) = \sum_w \gamma_m(w) \frac{U_{w,k} - \mu_{m,k}}{(\sigma_{m,k})^2}$$

$$FV_\sigma(d; m, k) = \sum_w \gamma_m(w) \left[ \frac{(U_{w,k} - \mu_{m,k})^2}{(\sigma_{m,k})^3} - \frac{1}{\sigma_{m,k}} \right]$$

where $FV_\mu(d; m, k)$ is the gradient with respect to the k-th dimension of the mean for Gaussian in and $FV_\sigma(d; m, k)$ is the gradient with respect to the k-th dimension of the variance for Gaussian m. The Fisher Vector FV(d) of document d is the concatenation of the gradient values $FV_\mu(d; m, k)$ and $FV_\sigma(d; m, k)$. A power-normalization can be applied (functionally similar to the square-rooting of the histogram if the power value is 0.5) to normalize the Fisher Vector, and/or L2 normalization can be applied. See Perronnin et al., "Improving the Fisher kernel for large-scale classification", in ECCV 2010. The resulting Fisher Vector FV(d) is suitably substituted for the vector of topic probabilities of the example of FIG. 7 (that is, Fisher VectorFV(d) is suitably substituted for the histogram 116 in FIG. 7). The Fisher Vector FV(d) serves as the topic model representation of the document 110.

Experimental document processing employing the disclosed word embedding transforms for transforming text words $w_i$ into a K-dimensional space as K-dimensional word vectors $U_i$ has been applied to document collections including: (1) the 20 Newsgroup text categorization collection (a standard text categorization dataset with 20 classes and almost 20,000 documents with about 33,000 vocabulary words); (2) an Industry Sector text categorization collection (containing about 9,500 documents and 24,000 vocabulary words); and (3) the CLEF 03 information retrieval collection (a standard information retrieval testbed collection with 166,754 documents and 79,986 vocabulary words). Note that for these collections the BOW vector would have around 20,000-80,000 dimensions. In contrast, in various test processing performed using the disclosed approach employing embedded continuous words, the dimensionality K was 10-200 dimensions. More generally, it is expected that K should be at least two, and more preferably at least five, and still more preferably at least ten, in order to provide sufficient dimensionality for the embedded continuos words. The disclosed GMM was used as a probabilistic topic model, with the number of Gaussian components (M) being 64 or lower. These experiments have shown that the disclosed approaches yield effective descriptors of textual documents.

Document processing employing the disclosed word embedding transforms to generate bag-of-embedded-continuous-words (BOEW) document representations has numerous advantages. It is straightforward to inject prior knowledge on words in the BOEW representation, for example by using a priori-known similarity between words provided by a thesaurus (which may optionally be domain-specific). It is also feasible to assign probabilities for words unseen during a training phase assuming that a suitable word embedding transform can be generated (see FIG. 4 and related discussion herein). In other words, it is feasible to add new words after training the model. It follows that the probabilistic topic model can be trained on only a part of a document collection containing only some of the vocabulary words, and subsequently the model can be extended to include words that were not seen by the training. This can facilitate processing of large document collections by performing the computationally intensive probabilistic topic model training on a relatively small sub-set of the collection.

Another possible application of this ability to extend the vocabulary after model training is in the context of cross-lingual and multi-lingual problems. For instance, assume two aligned corpora of English documents in a matrix E and French documents in a matrix F. In this case, a co-clustering algorithm can be used to generate word embedding transforms for embedding both English and French words in the same K-dimensional space. Then, a probabilistic topic model can be learned for one language (and optionally a classifier may additionally be learned that uses this topic model), and the probabilistic topic model (and optional classifier) can be directly transferred to the other language (or to a bilingual document including text in both first and second languages). This is so because the probabilistic topic model (and optional classifier) operates on the embedded word vectors in the K-dimensional space, which are the same for both English and French words.

Yet another advantage of document processing employing the disclosed BOEW document representations is that the document representations are of low dimensionality as compared with high-dimensional BOW representations. Learning probabilistic topic models on these compressed representations is simplified due to a fewer number of parameters. For example, to learn 50 PLSA topics on the CLEF 03 information retrieval collection, one has to fit 50*79,000=3,950,000 parameters. In contrast, if the words are embedded in a K-dimensional space of 100 dimensions (i.e., K=100), then only 50×(2×100+1)=10,050 parameters have to be fitted for learning a mixture of 50 Gaussian components (corresponding to 50 topics). Furthermore, Fisher Vectors can give rich descriptors with few Gaussian components.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
an electronic data processing device configured to:
perform a modeling method including:
  constructing a set of word embedding transforms by operations including generating a term-document matrix whose elements represent occurrence frequencies for text words in documents of a set of documents and include inverse document frequency (IDF) scaling;
  applying the set of word embedding transforms to transform text words of a set of documents into K-dimensional word vectors in order to generate sets or sequences of word vectors representing the documents of the set of documents where K is an integer greater than or equal to two; and
  learning a probabilistic topic model comprising a mixture model including M mixture components representing M topics using the sets or sequences of word vectors representing the documents of the set of documents wherein the learned probabilistic topic model operates to assign probabilities for the topics of the probabilistic topic model to an input set or sequence of K-dimensional embedded word vectors; and
perform a document processing method including:
  applying the set of word embedding transforms to transform text words of an input document into K-dimensional word vectors in order to generate a set or sequence of word vectors representing the input document; and
  applying the learned mixture model to the set or sequence of word vectors representing the input document in order to generate one of (1) a vector or histogram of topic probabilities representing the input document or (2) one or more Fisher vectors representing the input document.

2. The apparatus of claim 1, wherein the document processing method further includes:
annotating the input document with one or more topic labels based on the vector, Fisher vector, or histogram of topic probabilities representing the input document.

3. The apparatus of claim 1, wherein the document processing method further includes:
identifying one or more documents other than the input document as being similar to the input document based on the vector, Fisher vector, or histogram of topic probabilities representing the input document.

4. The apparatus of claim 1, wherein the constructing the set of word embedding transforms is by operations further including:
applying a dimensionality reduction algorithm to generate K-dimensional word vectors corresponding to the text words of the term-document matrix.

5. The apparatus of claim 4, wherein the dimensionality reduction algorithm is selected from the group consisting of singular value decomposition (SVD), random indexing, and co-clustering.

6. The apparatus of claim 4, wherein:
the set of documents used in the constructing of the set of word embedding transforms comprises two aligned corpora including documents in a first natural language and documents in a second natural language,
the generating of a term-document matrix comprises generating a first term-document matrix for the documents in the first natural language and generating a second term-document matrix for the documents in the second natural language,
the applying of a dimensionality reduction algorithm comprises applying a co-clustering algorithm to both first and second term-document matrices to generate K-dimensional word vectors in the same K-dimensional space corresponding to the text words in both the first and second term-document matrices, and
the learning of a probabilistic topic model comprises learning a probabilistic model using sets or sequences of word vectors representing a set of documents of the first language but not the second language, wherein the learned probabilistic topic model operates to assign probabilities for topics of the probabilistic topic model to an input set or sequence of K-dimensional embedded word vectors generated by applying the set of word embedding transforms to a document in the first language, or the second language, or a combination of the first and second languages.

7. The apparatus of claim 1, wherein the modeling method further includes extending the set of word embedding transforms by identifying one or more related words of a new word and generating a K-dimensional word vector for the new word by aggregating the K-dimensional word vectors generated for the identified one or more related words by the set of word embedding transforms.

8. The apparatus of claim 1, wherein the set of word embedding transforms comprise a data structure associating text with corresponding K-dimensional word vector.

9. The apparatus of claim 1, wherein the probabilistic topic model comprises a Gaussian mixture model (GMM) including K-dimensional Gaussian components, the GMM including M Gaussian components corresponding to the M semantic topics.

10. The apparatus of claim 9, wherein in the performed document processing method, the applying includes:
applying the learned GMM to generate a vector or histogram of topic probabilities representing the input document.

11. The apparatus of claim 9, wherein in the performed document processing method, the applying includes:
applying the learned GMM to generate one or more Fisher Vectors representing the input document.

12. A non-transitory storage medium storing instructions executable by an electronic data processing device to perform operations including:
  constructing a set of word embedding transforms by applying a dimensionality reduction algorithm to a term-document matrix constructed form a set of training documents and having matrix elements storing word frequencies scaled by a metric indicative of the frequencies of occurrence of the words in the set of documents to generate K-dimensional word vectors corresponding to the text words of the term-document matrix;
  performing a modeling method including:
    applying the set of word embedding transforms to transform text words of a set of documents into K-dimensional word vectors in order to generate the sets or sequences of word vectors representing the documents where K is an integer greater than or equal to two; and
    learning a probabilistic topic model comprising M components representing M topics using the sets or sequences of word vectors representing the documents of the set of documents wherein the learned probabilistic topic model operates to assign probabilities for the topics of the probabilistic topic model to an input set or sequence of K-dimensional embedded word vectors; and
  performing a document processing method including:
    applying the set of word embedding transforms to transform text words of an input document into corresponding K-dimensional word vector in order to generate a set or sequence of word vectors representing the input document; and
    applying the learned probabilistic topic model to the set or sequence of word vectors representing the input document in order to generate a topic model representation of the input document comprising one of (1) a vector or histogram of topic probabilities representing the input document or (2) one or more Fisher vectors representing the input document.

13. The non-transitory storage medium of claim 12, wherein the topic model comprises a Gaussian mixture model (GMM) including M Gaussian components corresponding to the M topics of the topic model.

14. The non-transitory storage medium of claim 12, wherein the topic model representation of the input document comprises a vector or histogram of topic probabilities representing the input document.

15. The non-transitory storage medium of claim 12, wherein the topic model representation of the input document comprises one or more Fisher Vectors representing the input document.

16. The non-transitory storage medium of claim 12, wherein the the performing of a document processing method further includes annotating the input document with one or more topic labels based on the topic model representation of the input document.

17. The non-transitory storage medium of claim 12, wherein the performing of a document processing method further includes identifying one or more similar documents having topic model representations that are similar to the topic model representation of the input document.

18. The non-transitory storage medium of claim 12, wherein the stored instructions are executable by an electronic data processing device to perform the further operation of constructing the set of word embedding transforms as a data structure associating text words with corresponding K-dimensional word vectors.

19. The non-transitory storage medium of claim 12, wherein the stored instructions are executable by an electronic data processing device to perform the further operation of constructing the set of word embedding transforms as a data structure associating text words with corresponding K-dimensional word vectors.

20. A method comprising:
  (i) generating a probabilistic topic model comprising M topics by operations including:
    constructing a set of word embedding transforms used in the embedding operation by applying a dimensionality reduction algorithm to a term frequency-inverse document frequency matrix constructed form a set of training documents to generate K-dimensional word vectors corresponding to the text words of the term-document matrix;
    applying the set of word embedding transforms to transform text words of a set of documents into K dimensional word vectors in order to generate sets or sequences of word vectors representing the documents of the set of documents where K is an integer greater than or equal to two; and
    learning the probabilistic topic model using the sets or sequences of word vectors representing the documents of the set of documents wherein the learned probabilistic topic model operates to assign probabilities for the topics of the probabilistic topic model to an input set or sequence of K-dimensional embedded word vectors; and
  (ii) processing an input document by operations including:
    applying the set of word embedding transforms to transform text words of the input document into corresponding K-dimensional word vectors in order to generate a set or sequence of word vectors representing the input document; and
    applying the learned probabilistic topic model to the set or sequence of word vectors representing the input document to compute a set of statistics representing the input document based on the learned topic model;
  wherein the operations (i) and (ii) are performed by an electronic data processing device.

21. The method of claim 20, wherein the probabilistic topic model comprises a Gaussian mixture model (GMM) including M Gaussian components corresponding to the M topics of the probabilistic topic model.

22. The method of claim 20, further comprising:
  annotating the input document with one or more topic labels based on the computed statistics representing the input document;
  wherein the annotating is performed by an electronic data processing device.

23. The method of claim 20, further comprising:
  identifying one or more similar documents that are similar to the input document as measured by the computed statistics representing the input document;
  wherein the identifying is performed by an electronic data processing device.

24. The method of claim 20, wherein the computed statistics representing the input document comprise one or more Fisher Vectors representing topic probabilities for the input document.

* * * * *